United States Patent
St Amant et al.

(10) Patent No.: US 11,503,455 B2
(45) Date of Patent: Nov. 15, 2022

(54) PROCESSING CONFIGURATION DATA FOR A SUBSCRIBER IDENTIFICATION MODULE

(71) Applicant: Arm Limited, Cambridge (GB)

(72) Inventors: Renee Marie St Amant, Austin, TX (US); Andrew John Pickard, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/105,730

(22) Filed: Nov. 27, 2020

(65) Prior Publication Data
US 2022/0174472 A1    Jun. 2, 2022

(51) Int. Cl.
*G06F 11/00* (2006.01)
*H04W 8/18* (2009.01)

(52) U.S. Cl.
CPC .................. *H04W 8/183* (2013.01)

(58) Field of Classification Search
CPC ..... H04W 8/183; H04W 88/06; H04W 48/18; H04W 8/18; H04W 4/60; H04L 67/303; H04L 41/0803; H04L 63/0853
See application file for complete search history.

(56) References Cited

U.S. PATENT DOCUMENTS

2011/0306318 A1    12/2011    Rodgers et al.
2017/0289788 A1*   10/2017    Lalwaney ........... H04L 41/0803

OTHER PUBLICATIONS

Partial International Search Report for PCT/GB2021/052992 dated Feb. 16, 2022, 16 pages.
International Search Report and Written Opinion of the International Searching Authority for PCT/GB2021/052992 dated Apr. 7, 2022, 23 pages.

\* cited by examiner

*Primary Examiner* — Gary Lafontant
(74) *Attorney, Agent, or Firm* — Nixon & Vanderhye P.C.

(57) ABSTRACT

A method comprises storing first configuration data and operating software for a processing apparatus; executing the operating software using one or more processing devices of the processing apparatus in a configuration defined by the first configuration data so as to provide first processing apparatus functionality; and performing a transition process, the transition process comprising: accessing a subscriber identification module indicative of the transition process; and in response to accessing the subscriber identification module, replacing at least the first configuration data by second configuration data different to the first configuration data, so that the executing step, in a second configuration defined by the second configuration data provides second processing apparatus functionality, different to first processing apparatus functionality defined by the first configuration data.

16 Claims, 11 Drawing Sheets

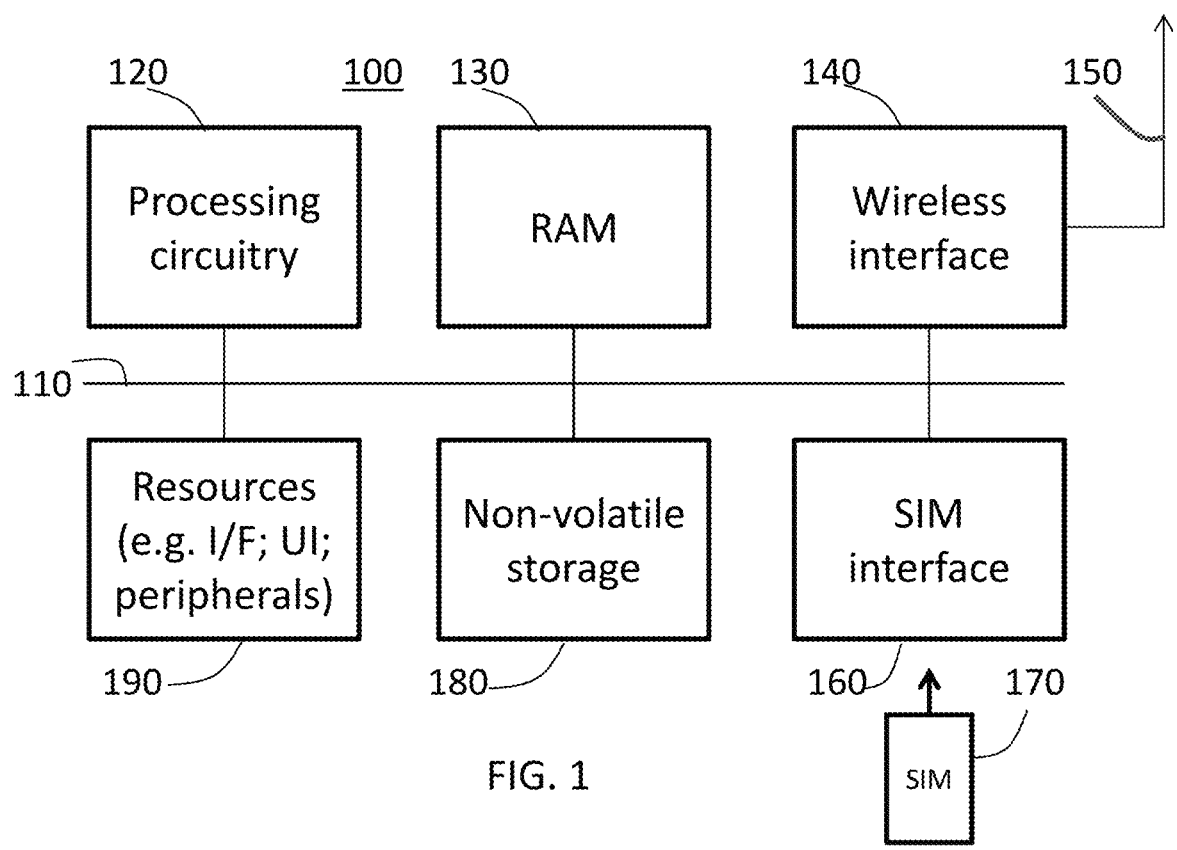
FIG. 1
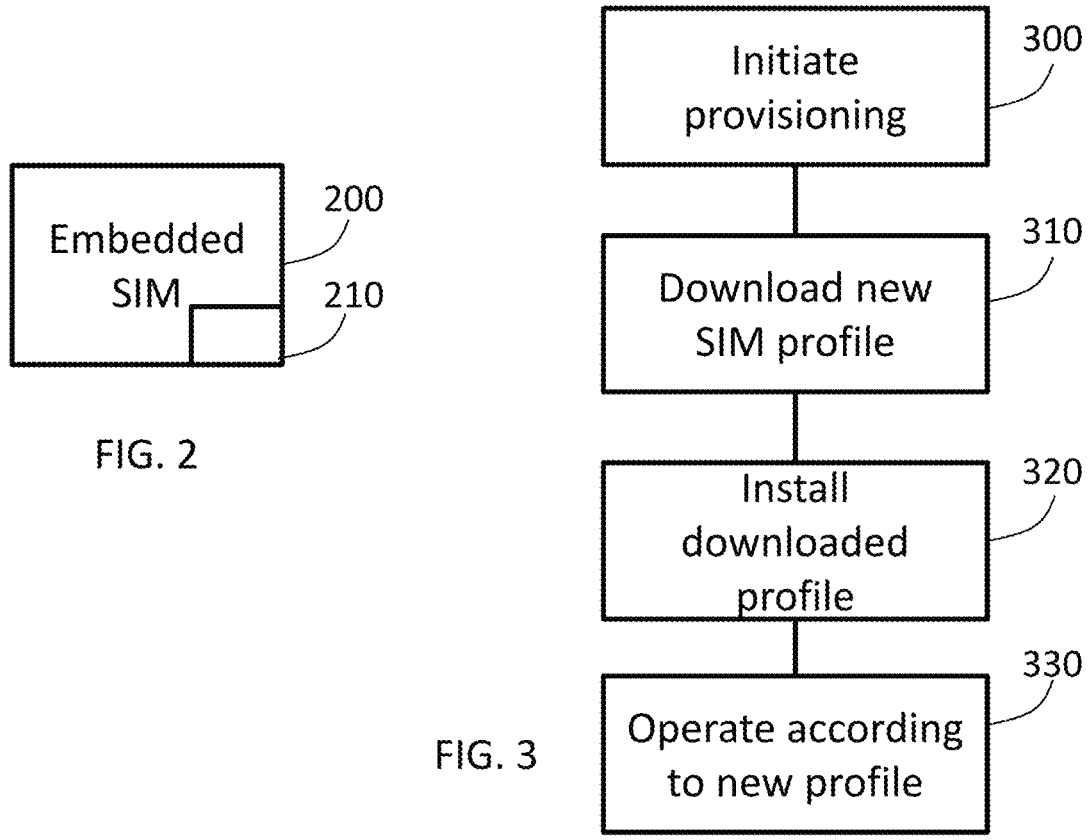
FIG. 2
FIG. 3

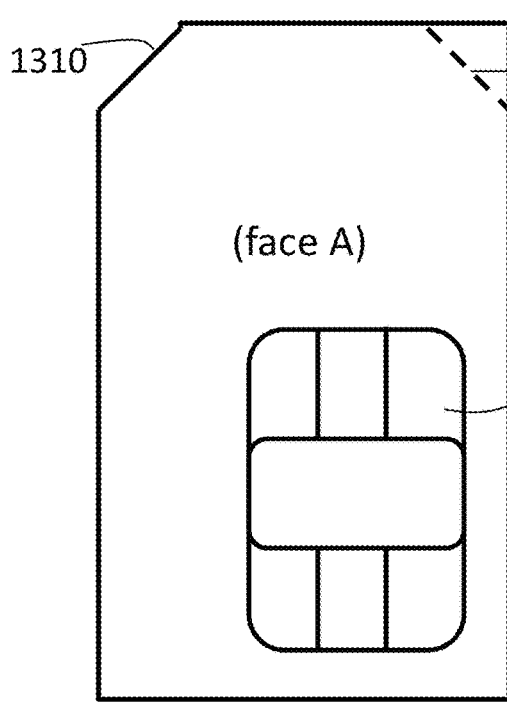
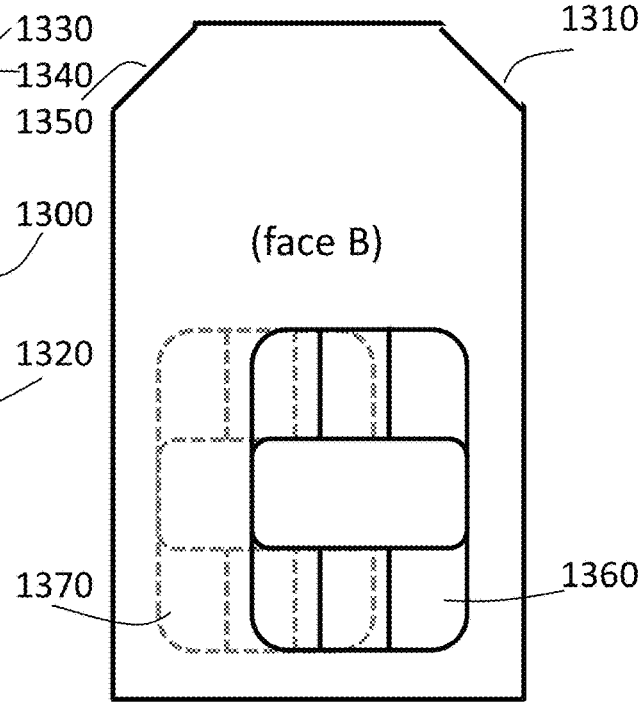
FIG. 13A  FIG. 13B
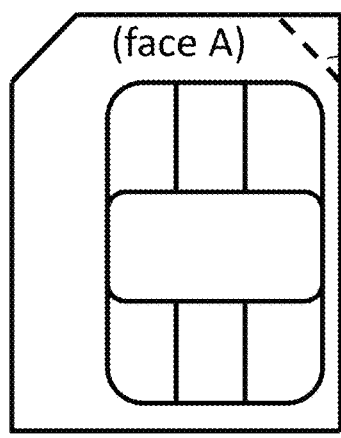
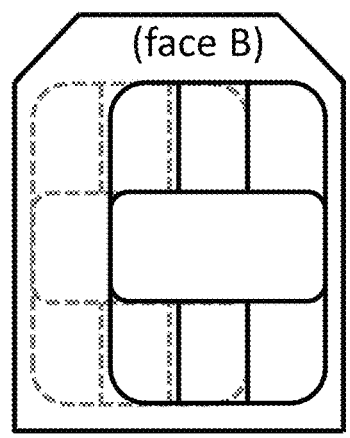
FIG. 14A  FIG. 14B
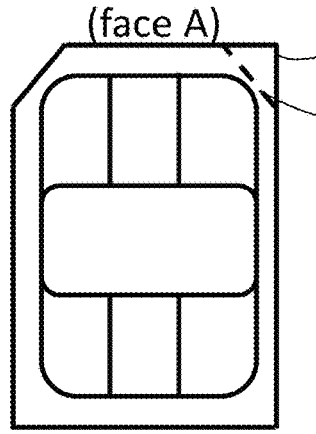
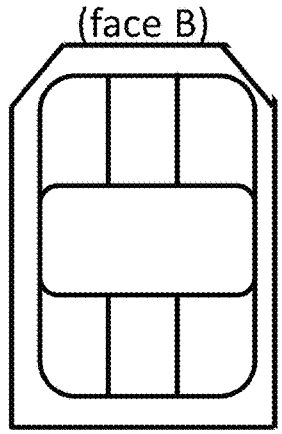
FIG. 15A  FIG. 15B

PROCESSING CONFIGURATION DATA FOR A SUBSCRIBER IDENTIFICATION MODULE

BACKGROUND

This disclosure relates to methods and devices.

Data processing apparatus is being continuously developed, particularly in consumer fields such as mobile telephony apparatus such as so-called smartphones.

It is often the case that a recently outdated smartphone is discarded, which can represent a waste of resources.

SUMMARY

In an example arrangement there is provided a method comprising:

storing first configuration data and operating software for a processing apparatus;

executing the operating software using one or more processing devices of the processing apparatus in a configuration defined by the first configuration data so as to provide first processing apparatus functionality; and performing a transition process, the transition process comprising:

accessing a subscriber identification module indicative of the transition process; and in response to accessing the subscriber identification module, replacing at least the first configuration data by second configuration data different to the first configuration data, so that the executing step, in a second configuration defined by the second configuration data provides second processing apparatus functionality, different to first processing apparatus functionality defined by the first configuration data.

In another example arrangement there is provided a device comprising:

a planar substrate having one or more alignment formations which are asymmetrically disposed so as to inhibit the planar substrate from fitting to a complementary module holder in an orientation other than a first predetermined orientation; in which:

the planar substrate is generally rectangular in shape and the one or more first alignment formations comprise one or more cut-away portions from the generally rectangular shape; and the planar substrate comprises a severable partition defining one or more portions of the planar substrate such that, when the one or more portions are removed by severing of the severable partition, the planar substrate comprises one or more second alignment formations, disposed so as to allow the planar substrate to fit to the module holder in a second predetermined orientation different to the first predetermined orientation.

In an example arrangement there is provided a method comprising:

storing first configuration data and operating software for a processing apparatus;

executing the operating software using one or more processing devices of the processing apparatus in a configuration defined by the first configuration data so as to provide processing apparatus functionality;

executing a transition process to replace at least the first configuration data by second configuration data different to the first configuration data, so that the executing step, in a configuration defined by the second configuration data, provides second processing apparatus functionality, different to first processing apparatus functionality provided in a configuration defined by the first configuration data; and inhibiting storage of the first configuration data by the processing apparatus after performing the step of executing the transition process.

Further respective aspects and features of the present disclosure are defined by the appended claims.

BRIEF DESCRIPTION OF THE DRAWINGS

The present technique will be described further, by way of example only, with reference to embodiments thereof as illustrated in the accompanying drawings, in which:

FIG. 1 schematically illustrates a data processing apparatus;

FIG. 2 schematically illustrates an embedded SIM (subscriber identification module);

FIG. 3 is a schematic flowchart illustrating a method;

FIGS. 13a, 13b, 14a, 14b, 15a, 15b, 16a, 16b and 17-19 schematically illustrate configurations of SIMs;

DESCRIPTION OF EMBODIMENTS

Figure 4:
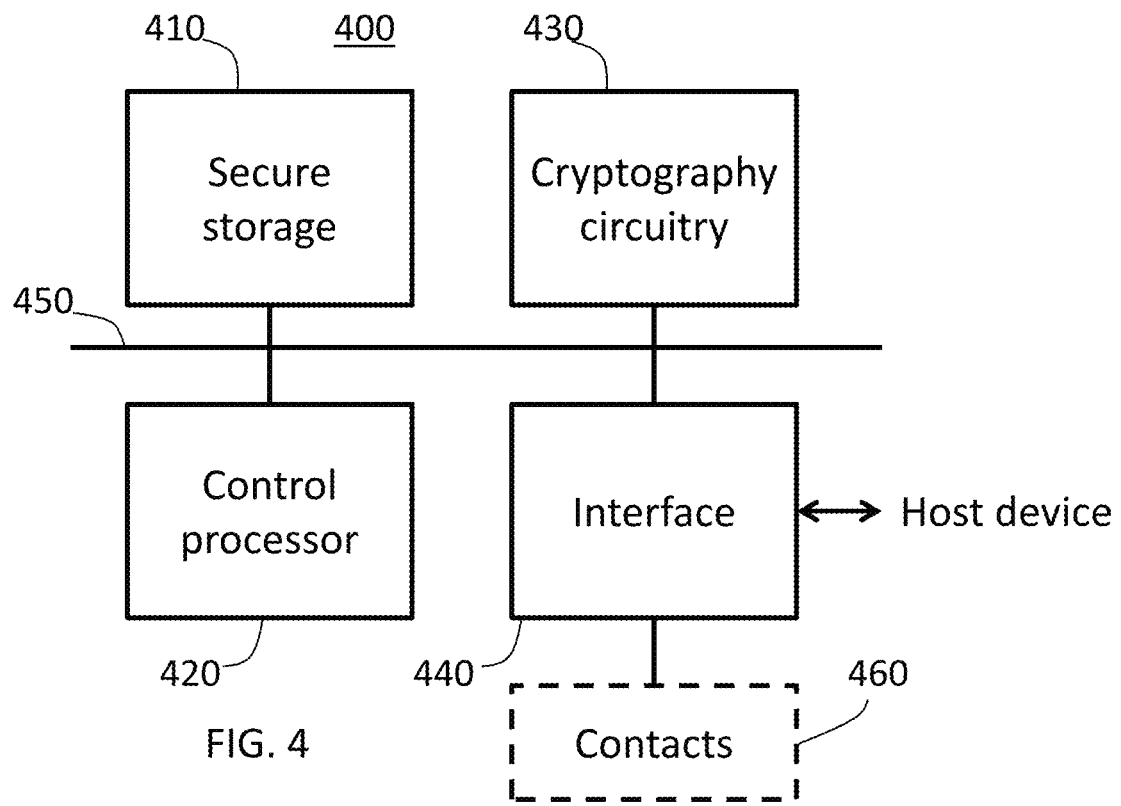
FIG. 4 schematically illustrates circuitry for use in a SIM.

Before discussing the embodiments with reference to the accompanying figures, the following description of embodiments is provided.

An example embodiment provides a method comprising:

storing first configuration data and operating software for a processing apparatus;

executing the operating software using one or more processing devices of the processing apparatus in a configuration defined by the first configuration data so as to provide first processing apparatus functionality; and performing a transition process, the transition process comprising:

accessing a subscriber identification module indicative of the transition process; and in response to accessing the subscriber identification module, replacing at least the first configuration data by second configuration data different to the first configuration data, so that the executing step, in a second configuration defined by the second configuration data provides second processing apparatus functionality, different to first processing apparatus functionality defined by the first configuration data.

Such a method can advantageously allow for the repurposing of an apparatus (for example an otherwise outdated smartphone) into a second or otherwise different use, by performing a transition process with respect to that device. In examples, the transition process can be instigated or facilitated by the association of the apparatus with a subscriber identification module such as a SIM card or an embedded SIM, or the subscriber identification module can at least contribute to the process. In this way an aspect of security can be provided (in that an apparatus owner needs to insert, fit or associate the module for the transition to occur) and also the transition process can potentially be simplified by optionally providing at least some information as part of the or accessible via the module.

Example embodiments can provide one or more of the following types of functionality:

(a) the use of a SIM to provision a temporary ID on a common network for the purpose of transferring the necessary data to reconfigure a device to a new purpose;

(b) a SIM containing a pointer (for example a universal resource identifier or URI) to locate information that just says whether or not it is appropriate to proceed with a reconfiguration where all other newly required configuration data, software packages, and the like needed for reconfiguration and further functionality are already present on the device. In such examples only a small amount of information is transferred in this case.

(c) a SIM contains a pointer or URI to configuration files (where other necessary packages are already installed on the device). In this case, the configuration files are transferred.

(d) In addition to (b) or (c), some or all necessary software packages for the further functionality are also transferred.

(e) In addition to (b), (c) or (d), a new operating system (OS) image to boot into is transferred.

(f) In addition to any of (b) to (e), boot firmware is also transferred.

In the case of a device with a sophisticated OS, the OS may detect the presence of a further or special-purpose SIM and react/proceed accordingly, likely utilizing the package manager to remove the software packages that are no longer needed and add the new software packages required for the new device functionality (a relevant use case for this scenario would be the smartphone to edge content server transition). But actual implementation may be dependent on the sophistication of the software arrangement in use, for example a smartphone may be more sophisticated than an IoT-style (internet of things) device.

The apparatus can for example originally be a mobile telephony apparatus, in example embodiments in which the executing step comprises accessing a subscriber identification module indicative of the first configuration, different to the subscriber identification module indicative of the transition process, to define operation of the processing apparatus as a mobile telephony apparatus in the first configuration.

In examples, the transition may be a one-way or irrevocable transition, or at least difficult to reverse, in that the method may comprise inhibiting (for example, preventing) storage of the first configuration data by the processing apparatus after performing the transition process.

The association with the module may itself give rise to initiation of the transition, in example embodiments in which the method comprises detecting association of the processing apparatus with the subscriber identification module indicative of the transition process; and initiating the performing step in response to a detection of association of the processing apparatus with the subscriber identification module indicative of the transition process.

In example embodiments the replacing step may comprise: establishing a mobile communications transmission link using a subscriber identity provided by the subscriber identification module indicative of the transition process; and obtaining the second configuration data via the mobile telecommunications transmission link. In examples the replacing step comprises: provisioning the processing apparatus with the second configuration data; and rebooting the processing apparatus in the second configuration.

In order to facilitate transition but without necessarily needing to provide large and/or up to date data at the module, the subscriber identification module indicative of the transition process may define at least a universal resource indicator of a resource providing the second configuration data.

To inhibit unauthorised transition, the method may comprise one or both of: detecting a user input indicating secure user data and inhibiting the performing step unless the user input indicating the secure user data is detected, or detecting an apparatus identifier associated with the processing apparatus and inhibiting the performing step unless the apparatus identifier meets a predetermined condition.

In some examples, the second processing apparatus functionality defines functionality of at least one of the processing devices which is limited with respect to the respective functionality defined by the first processing apparatus functionality.

To avoid the unauthorised distribution of personal data in the second or other use of the apparatus, where the configuration data comprises personal data defining at least personal attributes of a user of the processing apparatus, the replacing step may comprise deleting at least the personal data.

In some examples, an embedded or electronic module may be used rather than a physically insertable or fittable module. In such examples the subscriber identification module indicative of the transition process and the subscriber identification module indicative of the first configuration comprise a virtual subscriber identification device which stores secure data indicating a respective first and second subscriber identity;

the step of detecting association of the processing apparatus with the subscriber identification module indicative of the transition process comprises detecting a change of the secure data stored by the virtual subscriber identification device; and the method comprises downloading, using the first subscriber identity, replacement secure data indicating the second subscriber identity.

In other examples the subscriber identification module indicative of the transition process and the subscriber identification module indicative of the first configuration are physical subscriber identification devices for fitting to a module holder of the processing apparatus; and the step of detecting association of the processing apparatus with the subscriber identification module indicative of the transition process comprises detecting insertion of the subscriber identification module indicative of the transition process into the module holder of the processing apparatus.

In examples arrangements using a physical module, the subscriber identification module indicative of the first configuration may comprise:

a planar substrate having one or more alignment formations which are asymmetrically disposed so as to inhibit the planar substrate from fitting to the module holder in an orientation other than a first predetermined orientation; in which the planar substrate is generally rectangular in shape and the one or more first alignment formations comprise one or more cut-away portions from the generally rectangular shape; and the planar substrate comprises a severable partition defining one or more portions of the planar substrate;

the method comprising:

severing the severable partition to remove the one or more portions so that the planar substrate then comprises one or more second alignment formations;

fitting the planar substrate to the module holder in a second predetermined orientation different to the first predetermined orientation, the planar substrate when fitted to the module holder in the second predetermined orientation providing the subscriber identification module indicative of the transition process. This allows a module such as a SIM to be reconfigured by removing a portion so as to allow it to fit in another orientation into a holder. For example, the second predetermined orientation is a planar inverted orientation with respect to a planar orientation of the planar substrate in the first predetermined orientation.

In some examples, the processing apparatus is a mobile telecommunications apparatus;

the first processing apparatus functionality defines mobile telecommunication operation using a first set of wireless communication frequencies; and the second processing apparatus functionality defines mobile telecommunication operation using a second set of wireless communication frequencies, in which at least some of the second set wireless communication frequencies are not in the first set of wireless communication frequencies.

Another example embodiment provides a non-transitory machine-readable storage medium which stores computer software which, when executed by a processing apparatus, causes the processing apparatus to perform the method of claim 1.

A transition process as discussed above can be facilitated by the use (and insertion into a complementary holder) of a reconfigurable device such as (though not necessarily exclusively) a SIM. Other uses of such a reconfigurable device can include providing multiple user identities or providing a change of network, country of operation, network provider or the like. As an example of such a reconfigurable device, another example embodiment provides a device comprising:

a planar substrate having one or more alignment formations which are asymmetrically disposed so as to inhibit the planar substrate from fitting to a complementary module holder in an orientation other than a first predetermined orientation; in which:

the planar substrate is generally rectangular in shape and the one or more first alignment formations comprise one or more cut-away portions from the generally rectangular shape; and the planar substrate comprises a severable partition defining one or more portions of the planar substrate such that, when the one or more portions are removed by severing of the severable partition, the planar substrate comprises one or more second alignment formations, disposed so as to allow the planar substrate to fit to the module holder in a second predetermined orientation different to the first predetermined orientation.

In examples, such a device comprises a first set of electrical contact portions configured to abut complementary contact portions of the module holder when the device is fitted to the module holder in the first predetermined orientation; and a second set of electrical contact portions, at least some of the second set of electrical contract portions being different to the first set of electrical contact portions, configured to abut the complementary contact portions of the module holder when the device is fitted to the module holder in the second predetermined orientation. This allows electrical communication in at least the different possible orientations. In other examples, one or more common electrical contacts, useable in more than one orientation (whether in common with other orientation-specific contacts or not), may be provided.

To facilitate the use of multiple orientations of fitment to a holder, in example arrangements the device comprises first processing circuitry connected to the first set of electrical contact portions and configured to provide a first processing function when the device is fitted to the module holder in the first predetermined orientation; and second processing circuitry connected to the second set of electrical contact portions and configured to provide a second processing function, at least partly different to the first processing function, when the device is fitted to the module holder in the second predetermined orientation. The first and second processing circuitry may be entirely different or may share some functionality in common.

In example arrangements as mentioned above, the device is a subscriber identification module (SIM); and at least the first processing circuitry provides subscriber identification functions to enable mobile telecommunications by a processing apparatus according to a first subscriber identity when the device is fitted to a module holder of the processing apparatus.

For use in facilitating a transition process as discussed above, the second processing circuitry may provide device information to initiate the performance by the processing apparatus of a transition process comprising replacing at least first configuration data of the processing apparatus by second configuration data different to the first configuration data, so that the processing apparatus, in a second configuration defined by the second configuration data provides second processing apparatus functionality, different to first processing apparatus functionality defined by the first configuration data. For example the device information may comprise at least a universal resource indicator of a resource providing the second configuration data.

Although the host device and/or SIM holder may detect the fitment of the device in a second orientation, in other examples at least the second processing circuitry may be configured to communicate, to the processing apparatus, an indication that the device is fitted to the module holder in the second predetermined orientation.

In some examples, the first alignment formations comprise one or more cut-away portions from a first corner of the generally rectangular shape; and the severable partition defines a corner portion removable from a second corner, different to the first corner, of the generally rectangular shape. In some examples, the second corner is diagonally opposite, with respect to the generally rectangular shape, to the first corner. In some examples, the second predetermined orientation is a planar inverted orientation with respect to a planar orientation of the planar substrate in the first predetermined orientation.

The present disclosure may also be considered as a technique for providing a transition which is not in itself dependent upon the use of a "new" or replacement or different SIM or the like. In such arrangements, another example embodiment provides a method of operating a processing apparatus, the method comprising:

storing first configuration data and operating software;

executing the operating software using one or more processing devices of the processing apparatus in a configuration defined by the first configuration data so as to provide processing apparatus functionality;

executing a transition process to replace at least the first configuration data by second configuration data different to the first configuration data, so that the executing step, in a configuration defined by the second configuration data, provides second processing apparatus functionality, different to first processing apparatus functionality provided in a configuration defined by the first configuration data; and inhibiting storage of the first configuration data by the processing apparatus after performing the step of executing the transition process.

Overview of Apparatus

Referring now to the drawings, FIG. 1 schematically illustrates a data processing apparatus 100 comprising various components connected by a bus structure 110. The components shown by way of example in FIG. 1 include: processing circuitry 120 such as a central processing unit (CPU) or other processing element; a random access memory (RAM) 130 to store program code for execution; a wireless interface 140 such as a mobile telephony interface connected to an antenna 150; a SIM interface 160 to which a so-called SIM card 170 may be fitted; non-volatile storage 180 storing program code and configuration data defining a current configuration of the apparatus 100; and one or more processing resources 190.

Although the processing resources are not drawn individually they may comprise, for example, interface (I/F) components, user interface (UI) components, wireless (WiFi®) interfaces, other peripheral components and the like.

The apparatus, in its initial functionality, may be a mobile telephone, in which case the subscriber identification module 170 indicative of the first configuration, different to a subscriber identification module indicative of a transition process to be discussed below, defines operation of the processing apparatus as a mobile telephony apparatus in the first configuration.

Physical and Embedded SIMs

The arrangement of FIG. 1 makes use of a physical SIM card 170 which can be fitted to the SIM interface 160 to provide SIM functionality to be discussed below.

As an alternative, in place of the SIM interface and the physical SIM card 170, a so-called embedded SIM 200 (FIG. 2), otherwise referred to as an "e-SIM", may be used.

The embedded SIM 200 is implemented by functionality which is built in or hard wired into the apparatus 100 and is generally not user-replaceable in the same way that a physical SIM 170 may be replaced. Instead, the embedded SIM 200 comprises secure storage 210 to store a so-called SIM profile.

The SIM profile defines aspects of the SIM functionality and may include one or more cryptographic keys, SIM identification information and the like. Generally similar data is stored in a physical SIM and in an e-SIM; the main difference is that the SIM profile in a physical SIM is held securely and cannot generally be modified, whereas secure updating techniques are used in an e-SIM specifically to allow a secure process to be performed to update the SIM profile held by the e-SIM.

Generally speaking, at manufacture of the apparatus 100, the storage 210 of the e-SIM may be populated with a so-called bootstrap profile. This bootstrap profile enables initial and basic SIM functionality, at least to the extent required to provision the embedded SIM 200 with a working SIM profile for subsequent use.

An example of a provisioning process is shown schematically in the flowchart of FIG. 3. Here, a provisioning (or re-provisioning) process is initiated at a step 300, for example by the processing apparatus (which may be under user control to initiate this particular process) and/or by a mobile telephony operator or SIM provider. At a step 310, a new SIM profile is downloaded using a wireless communication channel defined at least in part by the current SIM profile held by the embedded SIM 200. At a step 320 the downloaded SIM profile is installed into the secure storage 210 and at a step 330 operation continues according to the newly installed SIM profile.

In this way, a change of SIM, equivalent in many ways to removing the physical SIM and inserting a different physical SIM, may be achieved without physical intervention, by an over-the-air (OTA) secure update of the SIM profile held by the secure storage 210 of the embedded SIM 200.

In the context of the example techniques to be discussed below, the provisioning or re-provisioning of an e-SIM can be considered to initiate the same functionality as the insertion or fitment of a physical SIM. In other words, the subscriber identification module indicative of the transition process and the subscriber identification module indicative of the first configuration comprise a virtual subscriber identification device which stores secure data indicating a respective first and second subscriber identity; a step of detecting association of the processing apparatus with the subscriber identification module indicative of the transition process (to be discussed below) comprises detecting a change of the secure data stored by the virtual subscriber identification device; and the methods to be discussed below comprise downloading, using the first subscriber identity, replacement secure data indicating the second subscriber identity. In other examples, the subscriber identification module indicative of the transition process and the subscriber identification module indicative of the first configuration may be physical subscriber identification devices 170 for fitting to a module holder of the processing apparatus; and the step of detecting association of the processing apparatus with the subscriber identification module indicative of the transition process comprises detecting insertion of the subscriber identification module indicative of the transition process into the module holder of the processing apparatus.

Overview of SIM Functionality

FIG. 4 schematically illustrates so of the functionality of a SIM, whether a physical SIM or an e-SIM, in which the SIM 400 comprises secure storage 410 (which may include the functionality of the storage 210 of the embedded SIM of FIG. 2), a control processor 420, cryptography circuitry 430 and an interface 440, all connected by a bus structure 450.

The interface 440 provides interface functionality with the host device such as the apparatus 100 and, in the case of a physical SIM provides interface functionality via physical electrical contacts 460 connectable to a SIM receiving holder of the SIM interface 160 of the apparatus 100. It will be appreciated that in the case of an e-SIM, the contacts 460 and interface circuitry to interface with such contacts, are not provided.

Figure 5:
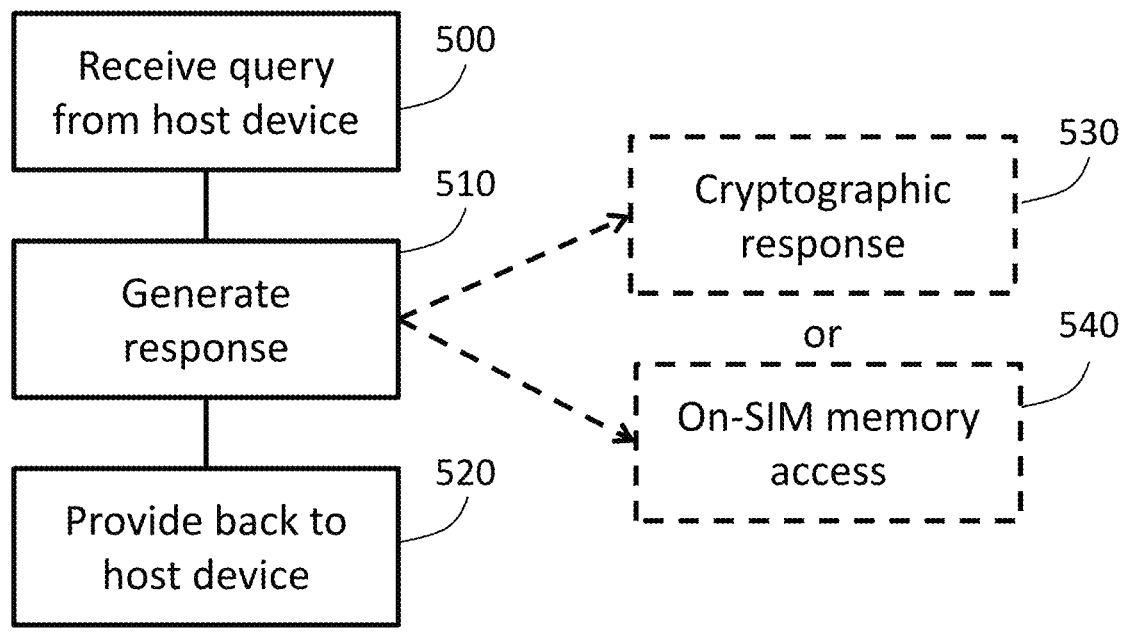
FIGS. 5-9 are schematic flowcharts illustrating respective methods.

The SIM receives power from the host device and in general terms provides functionality shown in FIG. 5 in which, at a step 500 the SIM receives a query from the host device, at a step 510 it generates response and at a step 520 provides the response back to the host device.

The nature of the response as generated at the step 510 may be a cryptographic response 530 or simply access to storage provided on the SIM 540, the results of which may be encrypted if appropriate.

The cryptographic response may act upon a challenge value provided by the host device and generates a cryptographic result or hash from that challenge value using the cryptography circuitry 430 and one or more secure keys stored by the secure storage 410. When the hash value is provided back to the host device, this can in turn be provided back to the mobile telephony network in order to validate or identify the particular node represented by the host device 100 and the currently installed SIM.

Transitioning of Functionality

Example embodiments of the present disclosure provide techniques for transitioning or changing the functionality of the apparatus of FIG. 1.

In some examples, the initial (or first) functionality of the apparatus of FIG. 1 may be that of a mobile telephone or tablet device, for example a so-called "smartphone". This functionality may be defined at least in part by first configuration data stored by the non-volatile storage 180.

In some examples, a transitioning process can be performed, for example using techniques to be discussed below, to change the functionality of the apparatus to that of, for example, an Edge server.

An edge server is a server device logically placed at the "edge" between two networks, for example between a private network and the internet. Edge servers can provide various different functionalities such as security or mail handling, but in the present context the Edge server may be used as a content distribution server, providing quasi-static content to local users. An example is their use in an educational or local administrative context, for example in locations where network or local server provision is not well established, so that repurposed devices of the type discussed here can provide a substantive improvement, for example by providing utility locally while not requiring consistent (or potentially costly) internet connectivity.

While this represents one example of the use of a server such as an edge server, in a more general consideration, at least some of the present embodiments can provide a technique by which the device in its initial configuration is connected to a mobile data network in order to transfer any or all software, firmware or configuration components for the new operation. Although the mobile connection can then be continued as part of the new mode of operation, in some examples, the connection to the mobile network would be required as a minimum only during the transition, and no longer required afterwards.

In general, the present techniques aim to offer a way to change a device's operation using the infrastructure of the mobile network to make the change. The mobile network in some cases will not be used after the change is made.

The reference to quasi-static content refers to the following. The content may be largely static content, in examples in which the device would not be getting new content via an internet connection or trying to transfer large amounts of content via a communications network after the device re-purposing has taken place. However, using a different SIM (see below), in some embodiments, there may be data (such as relatively small amounts of usage data) that could be sent over the communications network, for example, 'to inform a non-governmental organization on summarized usage statistics of the repurposed.

The content, however, could be updated via inserting a new SD ("secure digital") or similar storage card into the device (in cases where it is physically accessible). That is, the further configuration mounts the SD card storage as the content to be served. In such examples replacing the SD card content can happen locally without connectivity.

Therefore, in such a context, transitioning a "used" smartphone to the functionality of an Edge server or other device could be conducted by or on behalf of charitable or other non-governmental organisations with the aim of increasing or augmenting the digital infrastructure in developing nations. Such a transition of functionality allows the re-use of a device which, although perhaps outdated as a smartphone, still has sufficient computing power and storage to provide a useful function as a locally accessible server.

Figure 6:
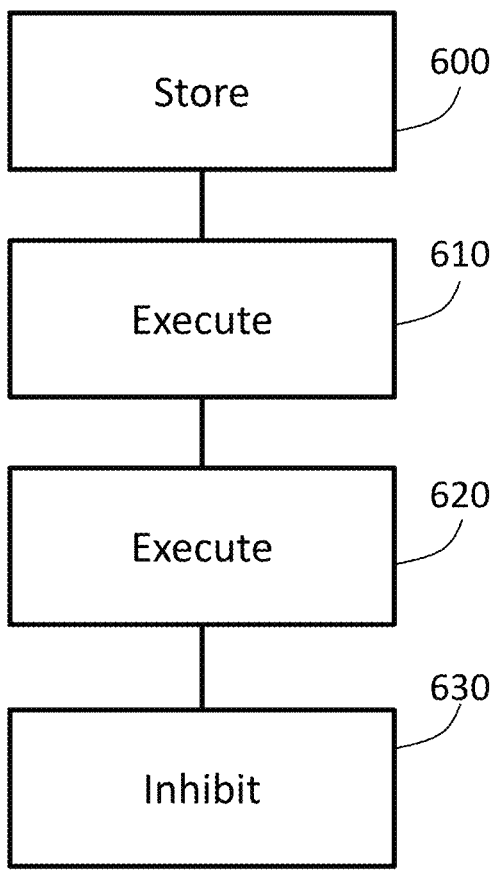

FIG. 6 is a schematic flowchart providing an overview of a transition process, embodied in this example as a method comprising:

storing (at a step 600) first configuration data and operating software for a processing apparatus, for example the apparatus 100 with at least the configuration data being stored by the non-volatile storage 180;

executing (at a step 610) the operating software using one or more processing devices (such as the processing circuitry 120) of the processing apparatus in a configuration defined by the first configuration data so as to provide processing apparatus functionality;

executing (at a step 620) a transition process to replace at least the first configuration data by second configuration data different to the first configuration data, so that the executing step, in a configuration defined by the second configuration data, provides second processing apparatus functionality, different to first processing apparatus functionality provided in a configuration defined by the first configuration data; and inhibiting (at a step 630) storage of the first configuration data by the processing apparatus after performing the step of executing the transition process.

In examples, the inhibiting step may comprise preventing a return to the first configuration data, so that the transition is a one-way transition. This can be useful in situations where, for example, a nation may not allow the importation of used smartphones, so that the smartphones, having been irrevocably transitioned to a second (non-smartphone) functionality such as that of an Edge server, may still be imported.

Transitioning Functionality by Association with a Different SIM

In some example embodiments, a transition process, such as the transition process referred to above, may be initiated or at least enabled (at least in part) by the association of the apparatus with a different SIM, whether by insertion of a different physical SIM card or by re-provisioning of an e-SIM of the apparatus. Note that there is in fact no requirement that the apparatus has an associated SIM in the first configuration to be discussed below, nor that it even makes use of wireless functionality defined by a SIM. Thus the process could involve going from an apparatus having no SIM (or no active installed SIM profile) to an apparatus having a fitted SIM or an active installed SIM profile.

There is also a potential use case where the SIM/mobile communications functionality is designed into a device just to use the communication network for example to initiate a firmware update on a device, for example in the situation of a recall (such as a medical apparatus) or avoiding obsolescence where some physical hardware components are still useable but the software must be updated (for example a battery charge inverter). For reasons of security, safety, and cost this method may be preferable than designing WiFi into the device.

In this case, the SIM may be used to initiate a transition from device purpose 1 to device purpose 2, but the SIM identity and communication functionality is not necessarily otherwise used as part of purpose 1 or purpose 2 (in other words it is only to enable the transition).

Figure 7:
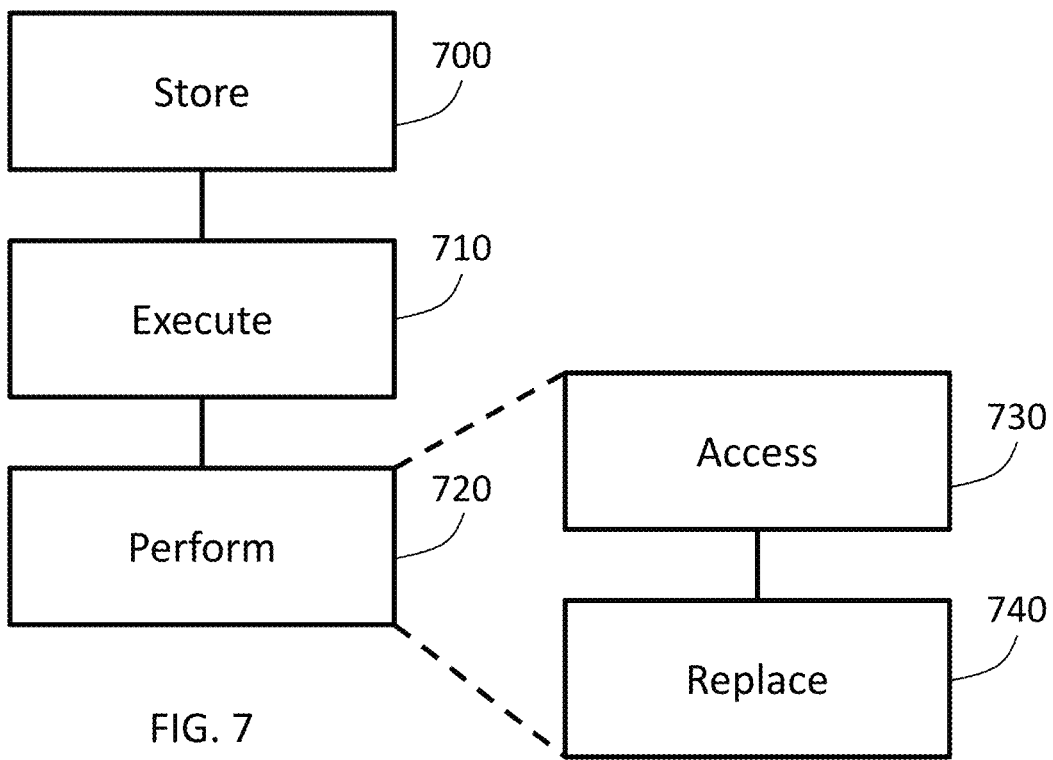

In such examples, a method may be performed as represented by the schematic flowchart of FIG. 7, for example comprising:

storing (at a step 700) first configuration data and operating software for a processing apparatus (for example, by the non-volatile storage 180 in the example case of the apparatus 100);

executing (at a step 710) operating software using one or more processing devices (such as the processing circuitry 120) of the processing apparatus in a configuration defined by the first configuration data so as to provide first processing apparatus functionality; and performing (at a step 720) a transition process, the transition process comprising:

accessing (at a step 730) a subscriber identification module (such as a newly installed or a newly provisioned SIM) indicative of the transition process; and in response to accessing the subscriber identification module, replacing (at a step 740) at least the first configuration data by second configuration data different to the first configuration data, so that the executing step, in a second configuration defined by the second configuration data provides second processing apparatus functionality, different to first processing apparatus functionality defined by the first configuration data.

In some examples, the processing apparatus is a mobile telecommunications apparatus; the first processing apparatus functionality (for example, before transition) defines mobile telecommunication operation using a first set of wireless communication frequencies; and the second processing apparatus functionality (after transition) defines mobile telecommunication operation using a second set of wireless communication frequencies, in which at least some of the second set wireless communication frequencies are not in the first set of wireless communication frequencies.

Figure 8:
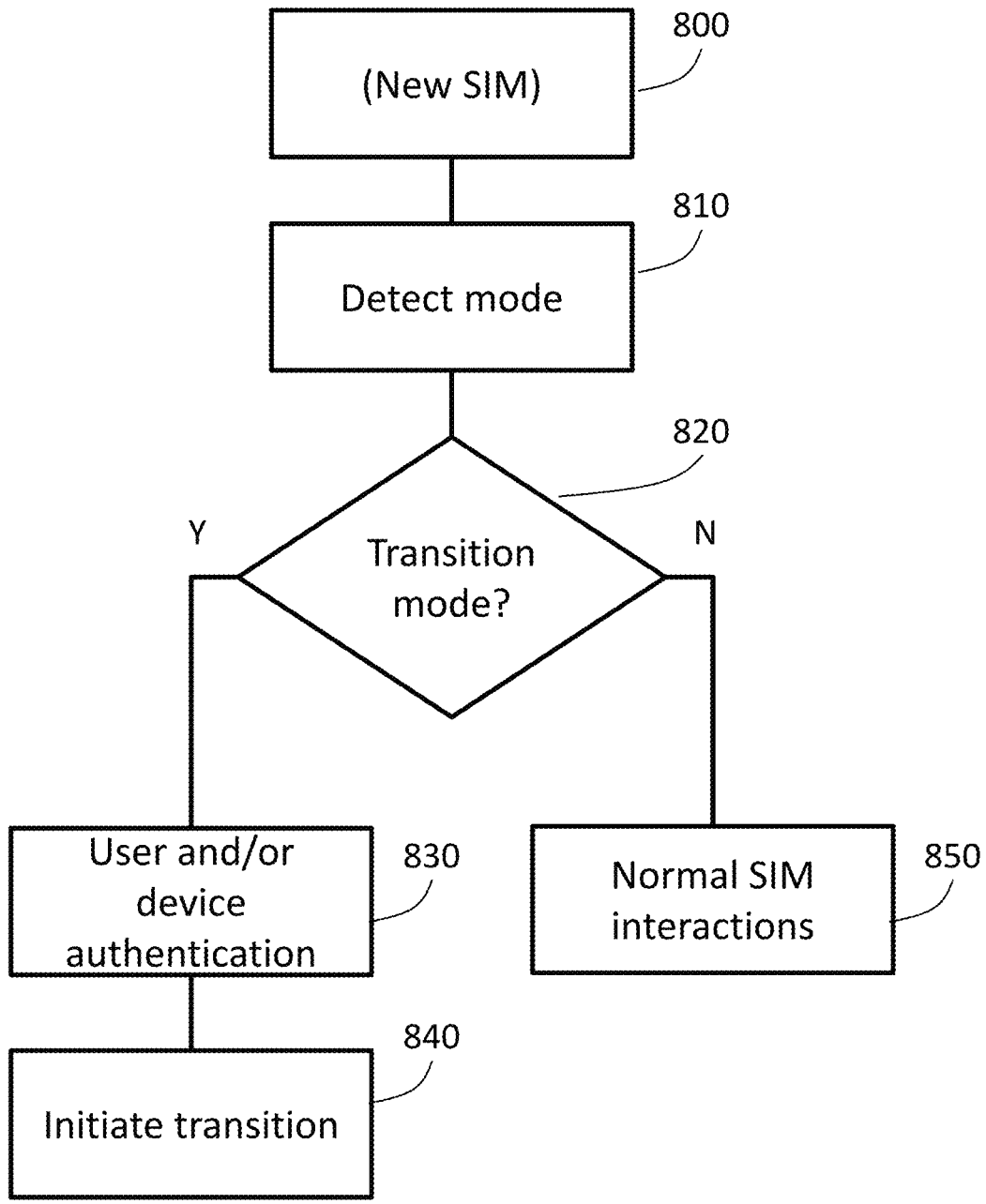

To provide more detail, on an exemplary basis, FIG. 8 is a schematic flowchart illustrating a set of actions by the processing apparatus 100 in response to the insertion of a new physical SIM or the provisioning of a new profile for an e-SIM, whether or not a Sim or a SIM profile was previously in place.

Such a newly installed SIM (either physical or embedded) is represented by a step 800. That SIM is referred to as a subscriber identification module indicative of a transition process and may facilitate and/or contribute to and/or initiate the transition process. In response to detection of one or more properties of the newly installed SIM, the apparatus detects a mode of operation at a step 810. If (at a step 820) this represents a transition mode then control passes to a step 830 at which the user is optionally requested to provide authentication and/or the apparatus 100 itself is subjected to device authentication. Assuming that both of these (or either if only one is performed) is successful, then a transition process is initiated at a step 840.

The steps 800, 810, 820 . . . 840 therefore provide an example of detecting (800) association of the processing apparatus with the subscriber identification module indicative of the transition process; and initiating (yes outcome of 820 through to 840) the performing step in response to a detection of association of the processing apparatus with the subscriber identification module indicative of the transition process.

A user authentication process may be one in which the user is required to provide a device password or other user information identifying that user, before the transition process is allowed to proceed. This can inhibit unauthorised or malicious transitioning of other people's devices for example.

A device authentication process can involve the device being interrogated for a device identifier such as a MAC (media access control) code, an International Mobile Equipment Identifier (IMEI) or other unique or quasi-unique identifier associated with the device. The identifier can be compared with an allowed list or category of identifiers by software overseeing the transition process and/or by software running at a remote server. This provides an example of detecting an apparatus identifier associated with the processing apparatus; and inhibiting the performing step unless the apparatus identifier meets a predetermined condition.

If, on the other hand, at the step 820 the mode represented by the newly installed SIM is not the transition mode then control passes to a step 850 at which normal SIM interactions occur.

Figure 9:
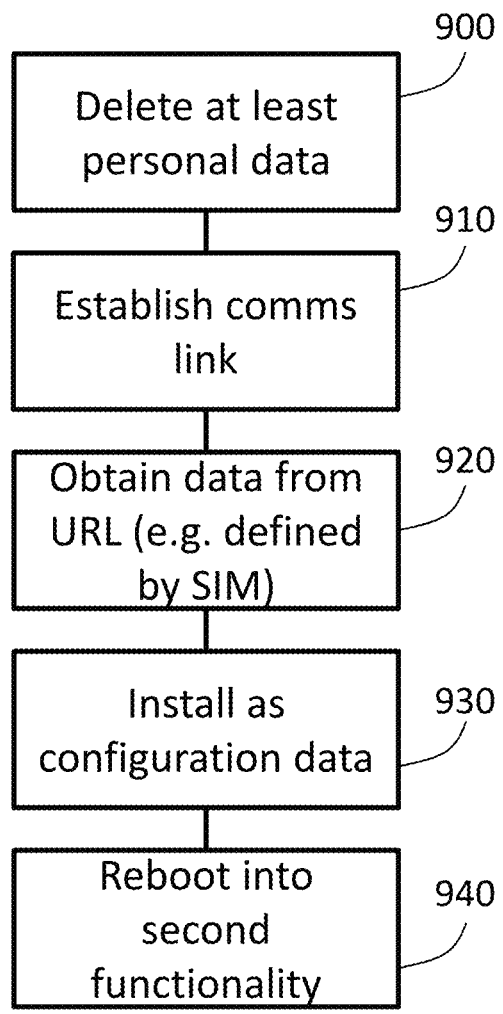

FIG. 9 is a schematic flowchart providing more detail of a transition process comprising at a step 900, the deletion of at least any personal data stored by the device, for example in the non-volatile storage 180. This provides an example in which the configuration data comprises personal data defining at least personal attributes of a user of the processing apparatus; and the replacing step comprises deleting at least the personal data.

At a step 910 the apparatus establishes a communications link using the newly installed SIM and at a step 920 obtains data from a network location, for example defined by a universal resource identifier (URI) which may be represented by data stored by the newly installed SIM. A URI can be a name, locator, or both for an online resource where a URL (universal resource locator) is just the locator. URLs are therefore a subset of URIs.

The steps 910, 920 therefore provide an example of establishing a mobile communications transmission link using a subscriber identity provided by the subscriber identification module indicative of the transition process; and obtaining the second configuration data via the mobile telecommunications transmission link.

At a step 930, the data obtained at the step 920 is installed to the processing apparatus 100 as configuration data and, at a step 940 the apparatus is rebooted using the newly installed configuration data such that it then has a second functionality defined by the newly installed configuration data.

In some examples, the second processing apparatus functionality defines functionality of at least one of the processing devices which is limited with respect to the respective functionality defined by the first processing apparatus functionality. For example, one or more of the resources may be reduced in function or disabled (such as a display and/or a Wi-Fi interface).

The steps 930, 940 provide an example of provisioning the processing apparatus with the second configuration data; and rebooting the processing apparatus in the second configuration.

The step 920 may involve obtaining software code to oversee the transition process from a transition server, for example, at an address or URI defined by data stored by the new SIM. In other examples, such software may be provided by storage associated with the SIM. In other examples, such software may have been pre-installed on the apparatus 100, for example in the non-volatile storage 180, but its use inhibited until and unless a transition process is initiated and authenticated. This provides an example in which the subscriber identification module indicative of the transition process defines at least a universal resource indicator of a resource providing the second configuration data.

Multiple-Use Physical SIM

In some example embodiments, a single physical SIM card or module may provide "normal" (pre-transition) functionality and, after a physical modification of the physical SIM, may be insertable in a different orientation to act as the "new" SIM associated with initiation of a transition process.

As background, various aspects of a physical SIM device or card will now be described to FIG. 10-12.

Figure 10:
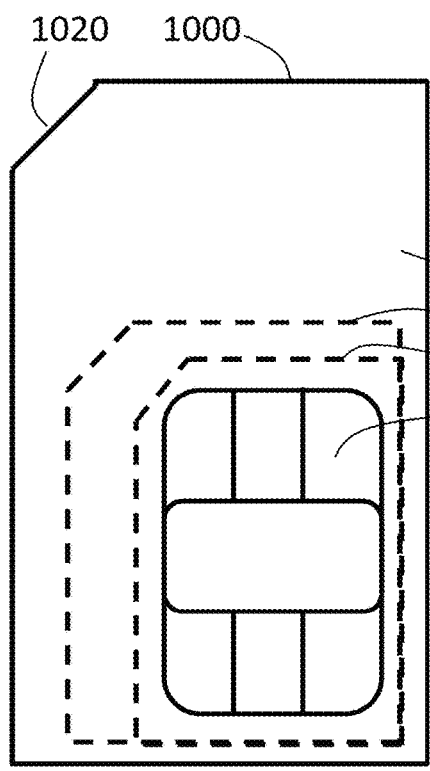
FIG. 10 schematically illustrates a SIM.

FIG. 10 represents a plan view of a physical SIM 1000. These are generally provided in a multi-use format such that the SIM as provided comprises a plainer substrate 1010 having one or more alignment formations 1020 such as a cut-away corner portion as drawn. Various electrical contacts shown schematically as contacts 1030 are provided in order to make electrical contact with complimentary formations in a SIM holder.

Frangible outlines 1040, 1050 may be provided to allow differently sized SIM cards to be formed from the card 1000 by breaking away an outer portion of the substrate 1010. So, the SIM card of FIG. 10 provides three different sizes of physical SIM for installation in a respective complimentary holder.

Processing circuitry (as described with reference to FIG. 4 but not shown in FIG. 10) is provided underneath the contacts 1030 and within the outline of the smallest of the cards, that is to say the card 1050.

Figure 11:
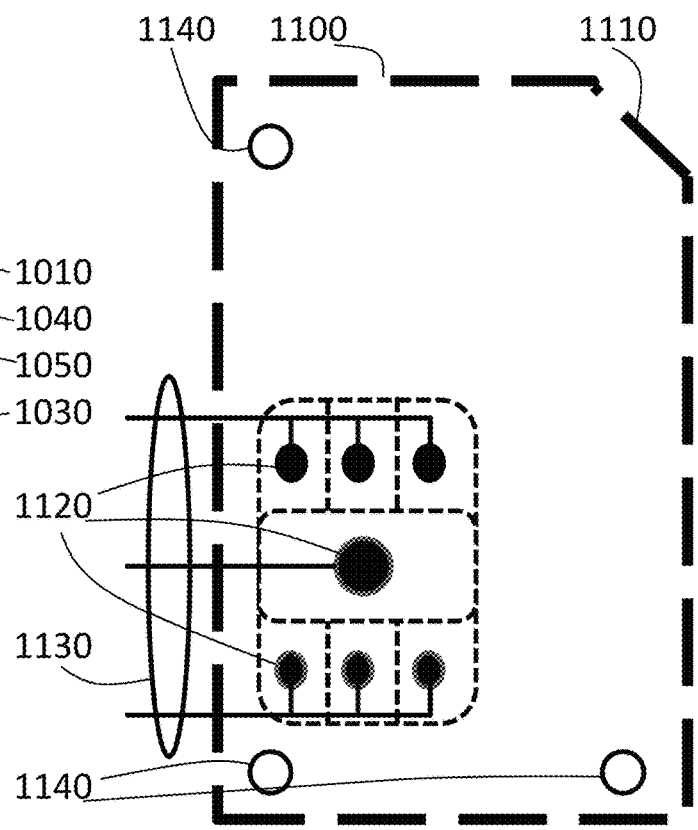
FIG. 11 schematically illustrates a SIM holder.

FIG. 11 schematically illustrates a holder 1100 complimentary to the largest of the SIM cards, that is to say the card defined by the whole of the substrate 910. Similar holders may be provided for smaller versions of the SIM card 1040, 1050. The holder has a complimentary alignment formation 1110 such that the card 1000 will fit in only one orientation into the holder 1100.

Electrical connectors 1120 are located so as to make contact, in use, with the contacts 930 and are connected by cabling and/or printed circuit board tracks 1130 to processing circuitry of the host device.

FIG. 11 also indicates three locations 1140 which will be discussed below with reference to example embodiments of the present disclosure.

Figure 12:
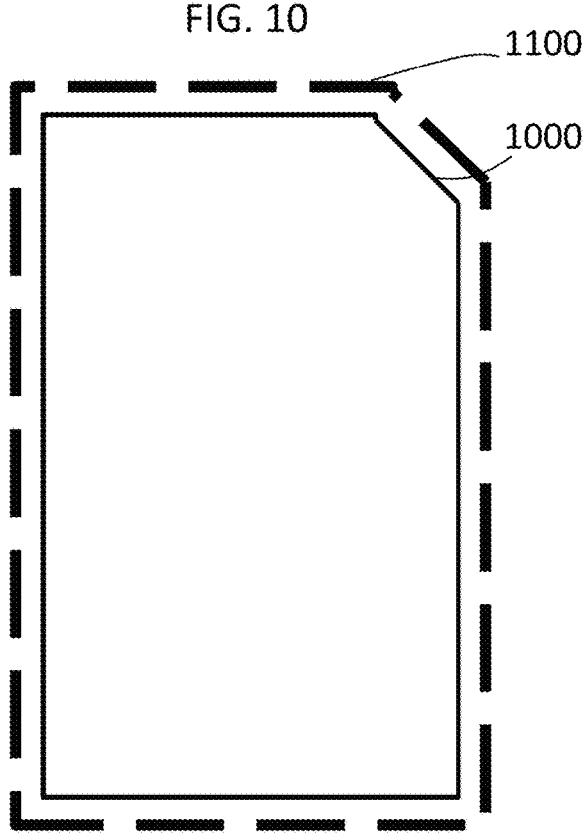
FIG. 12 schematically illustrates the SIM of FIG. 10 fitted to the holder of FIG. 11.

With reference to FIG. 12, in order to align the formation 920 with the formation 1110, the SIM card as drawn in FIG. 10 is inverted relative to its plane so that the contacts 930 are underneath the SIM card and it is then placed into the holder 1100 as drawn.

SIM Configuration Examples

Various configurations of a SIM card or physical SIM which allow multiple orientations of insertion into a complimentary SIM holder will now be described. These each provide an example of a device comprising a planar substrate having one or more alignment formations which are asymmetrically disposed so as to inhibit the planar substrate from fitting to a complementary module holder in an orientation other than a first predetermined orientation; in which: the planar substrate is generally rectangular in shape and the one or more first alignment formations comprise one or more cut-away portions from the generally rectangular shape; and the planar substrate comprises a severable partition defining one or more portions of the planar substrate such that, when the one or more portions are removed by severing of the severable partition, the planar substrate comprises one or more second alignment formations, disposed so as to allow the planar substrate to fit to the module holder in a second predetermined orientation different to the first predetermined orientation.

Referring first to FIG. 13a, a SIM card 1300 is shown, with its alignment formation 1310 arranged such that it is in the same planar orientation as the SIM card of FIG. 10 described above, which is to say it can be inverted and placed into the holder 11000 of FIG. 11.

Contacts 1320 are provided on the uppermost face of the SIM card 1300 as drawn ("face A") to mate with complimentary contacts 1120 in the SIM holder of FIG. 11 when the SIM 1300 is inverted and fitted to the holder.

A further corner 1330, different to the corner at which the alignment formation 1310 is provided, is shown marked by a broken line 1340. The broken line can represent a location at which the SIM card 1300 may be cut or may represent a perforated, weakened or otherwise frangible portion of the substrate from which the SIM card 1300 is formed. That is to say, the corner 1330 can be cut off along the line 1340 or broken off along the line 1340 depending on whether the line 1340 represents a frangible portion or simply a marker portion.

Therefore, the SIM 1300 will fit to the holder in a first orientation without any alteration at the corner 1330, by virtue of the alignment formation 1310. If and when the corner 1330 is removed along the boundary 1340, this provides another alignment formation giving at least one second, different, orientation in which the SIM 1300 may be fitted to the holder.

FIG. 13b shows an inverted view of the SIM card 1300 of FIG. 13a, which is to say that the other planar surface, face B, is uppermost as drawn in FIG. 13b.

The corner 1330 has been removed so that as well as the alignment formation 1310, a further alignment formation 1350 has been formed. On face B of the SIM card, a further set of contacts 1360 is provided. Note that the broken line representation 1370 indicates the location of the contacts 1320 on the opposite (now underside) face, face A, of the SIM card.

This provides an example having a first set of electrical contact portions 1320 configured to abut complementary contact portions of the module holder when the device is fitted to the module holder in the first predetermined orientation; and a second set of electrical contact portions 1360, at least some of the second set of electrical contract portions being different to the first set of electrical contact portions, configured to abut the complementary contact portions of the module holder when the device is fitted to the module holder in the second predetermined orientation. For example, referring to FIGS. 20 and 21, the SIM may provide first processing circuitry connected to the first set of electrical contact portions and configured to provide a first processing function when the device is fitted to the module holder in the first predetermined orientation; and second processing circuitry connected to the second set of electrical contact portions and configured to provide a second processing function, at least partly different to the first processing function, when the device is fitted to the module holder in the second predetermined orientation; in which the device is a subscriber identification module (SIM); and at least the first processing circuitry provides subscriber identification functions to enable mobile telecommunications by a processing apparatus according to a first subscriber identity when the device is fitted to a module holder of the processing apparatus.

In the examples, the first alignment formations comprise one or more cut-away portions 1310 from a first corner of the generally rectangular shape; and the severable partition defines a corner portion 1330 removable from a second corner, different to the first corner, of the generally rectangular shape.

Therefore, the arrangement may operate as follows.

In normal use, the corner 1330 is left in place so that the SIM card 1300 fits into the holder in only one orientation, namely an orientation in which the contacts 1320 mate with the complimentary contacts 1120 of the SIM holder.

In order to convert the SIM into the arrangement of FIG. 13b, which allows an inverted insertion into the SIM holder so that the contacts 1360 mate with the complimentary contacts 1120, the corner 1330 is removed at the boundary or marker 1340 so as to generate the new alignment formation 1350.

It is not a requirement that such a modified SIM (having a second or further possible insertion orientation) is used to initiate or contribute to a transition process of the type described above. The modified SIM, inverted "upside-down" could in fact be a SIM for a different network provider, a different country of operation, or the like. However, in the present examples, the modified SIM is used as the "new SIM" of the step 800 of FIG. 8 and at least contributes to the transition process as described.

Application of This Technique to Different SIM Sizes

As discussed above, a single SIM card can be embodied as a so-called "triple SIM" in which (referring back to FIG. 10) a "full size" SIM 1000, a "micro" SIM 1040 and a "nano" SIM 1050 may be generated from the same substrate by removing outer portions of the substrate where necessary. FIGS. 14a and 14b provide similar arrangements to those shown in FIGS. 13a and 13b but in the context of the so-called "micro" SIM. Once again, in FIG. 14b, a broken line indicates the location of the contacts provided on face A of the SIM. FIGS. 15a and 15b provide the same arrangement but in the context of the "nano" SIM. Note however that in FIG. 15b, the formation of the "nano" SIM is such that the contacts on each face overlie one another so a separate broken line representation of the opposite face contacts is not visible.

In each case, by removing a corner 1400, 1500 along a marker or frangible line 1410, 1510, the SIM can be inverted and inserted such that contacts on face B mate with the corresponding contacts in a SIM holder appropriate to that SIM size.

Further Example SIM Configurations

Figure 16A:
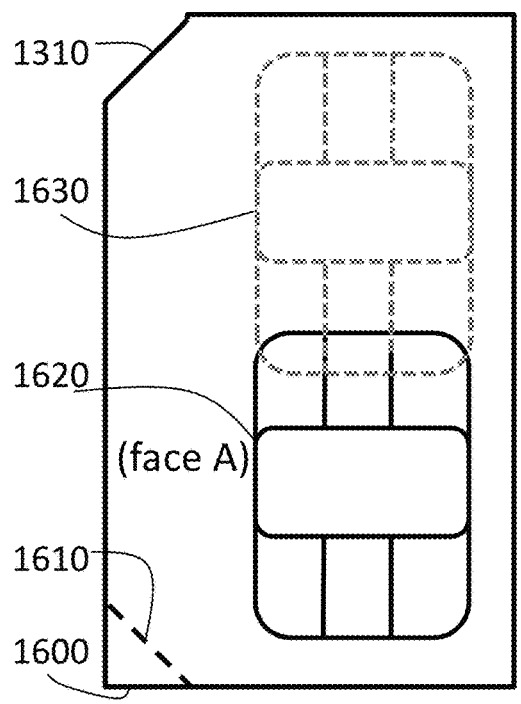
Figure 16B:
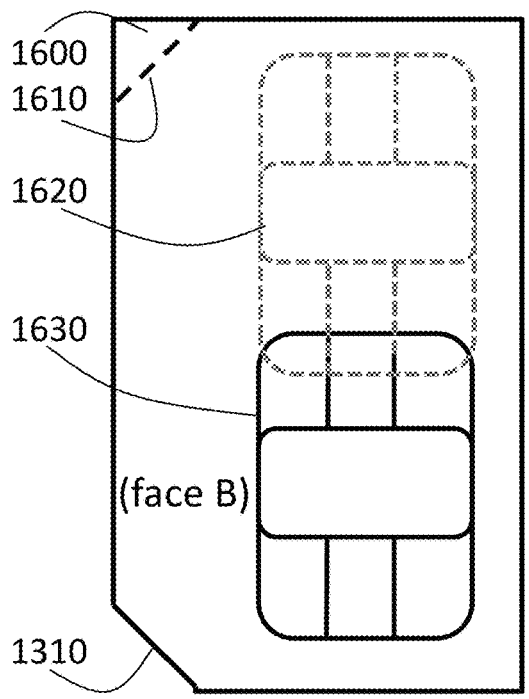

Referring to FIGS. 16a and 16b, which show face A and face B respectively of an example SIM, a removable corner 1600 is adjacent to the alignment formation 1310 on a long side of the SIM of FIG. 16a and is indicated by a marker or frangible portion 1610. A set of contacts 1620 are for use in the first configuration defined by the alignment formation 1310. A broken line represents the position on the opposite face of contacts for use in a second insertion orientation applicable after removal of the corner 1600.

FIG. 16b shows the opposite face, face B, of the same SIM, inverted vertically as well, with the removable corner 1600 still in place but showing the second set of contacts 1630 which may be used when the SIM is inserted (after removal of the corner 1600) with face B against the complimentary contacts of the SIM holder.

Figure 17:
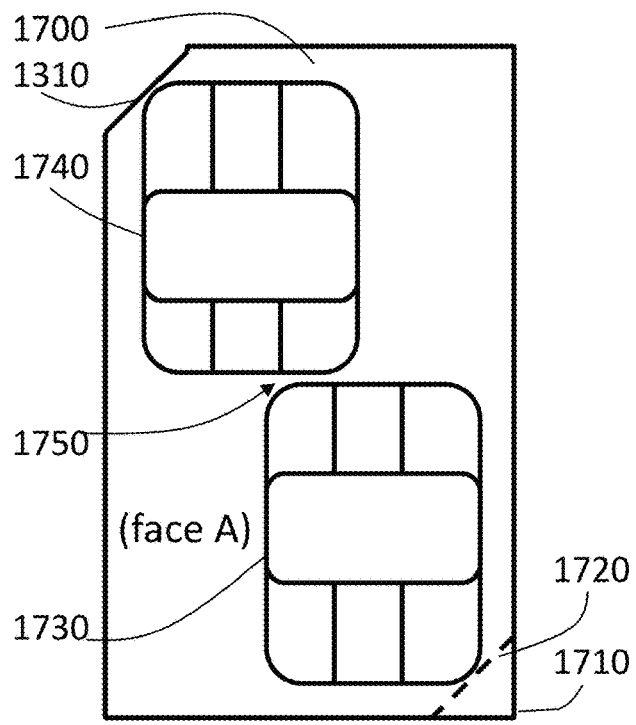

In the example of FIG. 17, a SIM 1700 may be insertable in two different orientations but in the same plane that is to say with face A against the complimentary contacts 1120 of the SIM holder, by rotating the SIM by 180 degrees in its own plane having removed a corner 1710 by a frangible or marker portion 1720. Here, contacts 1730 are applicable when the corner 1710 is still in place and the alignment portion 1310 is in use and contacts 1740 are applicable otherwise. Note that the formation of the two sets of contacts is such that they are truncated slightly (at the lower edge of the contacts 1740 as drawn and/or the upper edge of the contacts 1730 as drawn) so as not to overlap at a region 1750. Given that typical SIM holders provide a tolerance or leeway in the required locations of the SIM card contacts, this minor truncation at the region 1750 can be performed without necessarily affecting the functionality of the SIMs.

Figure 18:
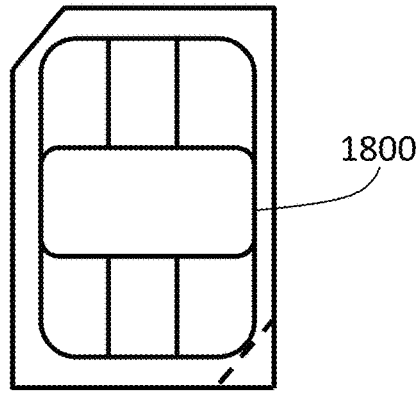

However, in the case of the "micro" or "nano" SIMs, it may be necessary that the contacts are repurposed if the SIM is inserted in the "other" orientation but with the same plane of the SIM abutting the SIM holder contacts. FIG. 18 shows an arrangement similar to that of FIG. 17 but with respect to a smaller format SIM, and techniques to be discussed below will be required to share the contacts 1800 between the two orientations.

Figure 19:
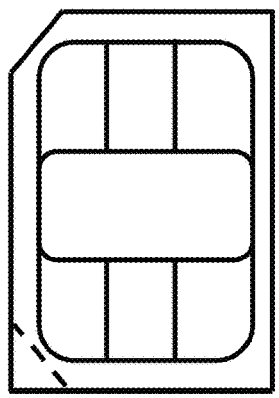

For completeness, FIG. 19 provides an arrangement similar to that of FIGS. 16a and 16b but in the context of a smaller form factor SIM.

As a modification of FIG. 4, a SIM card which has contacts on both sides may comprise a contacts interface 2000 (FIG. 20) capable of switching, using detector and switch circuitry 2010, between the two or more sets of contacts 2020, 2030 and also detecting power provision to the various contacts. Techniques will be discussed below for arranging this switching operation.

Figure 21:
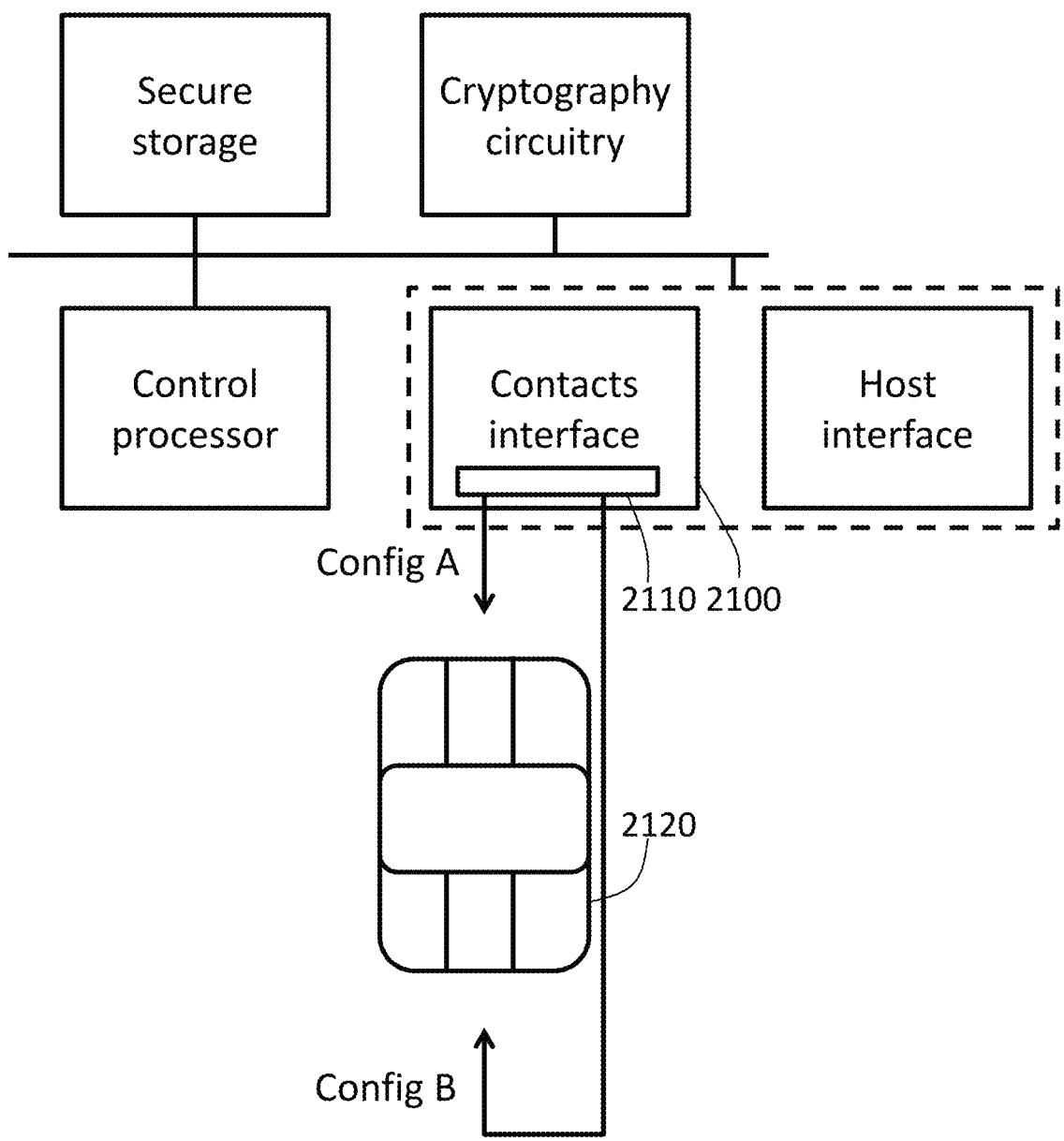

Referring to FIG. 21, in the example case (for example as shown in FIG. 18) that a SIM card may be inserted in a rotated orientation (but in the same plane), a single set contacts may need to be shared between the two orientations. Here, a contacts interface 2100 (FIG. 21) is switchable using detector and switch circuitry 2110 between connections to the contacts 2120 in an orientation defined by a configuration ("Config") A and an orientation defined by a configuration B, again using techniques to be described below.

Figure 20:
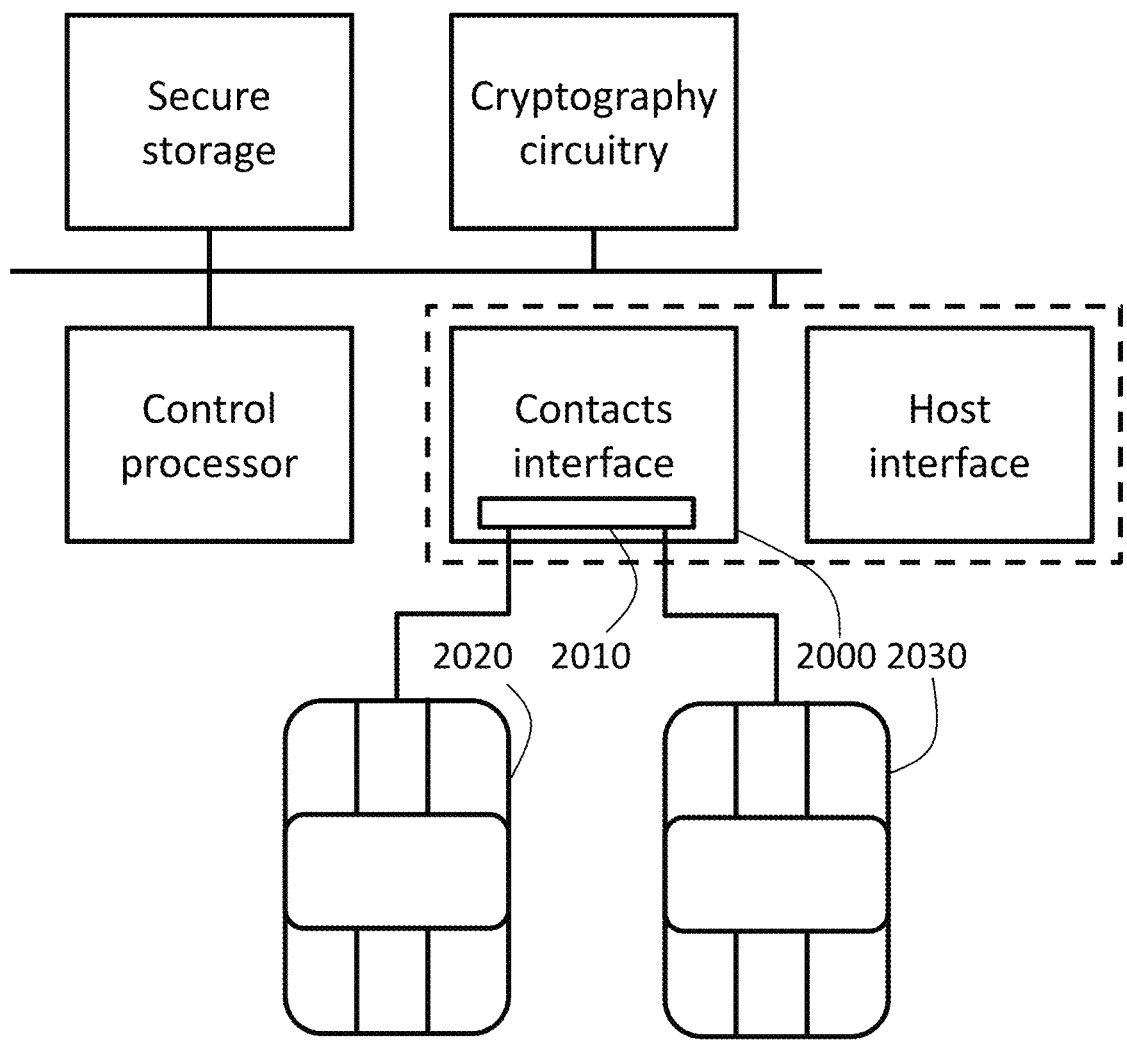
FIGS. 20 and 21 schematically illustrate respective circuitry for use in a SIM.
Figure 22:
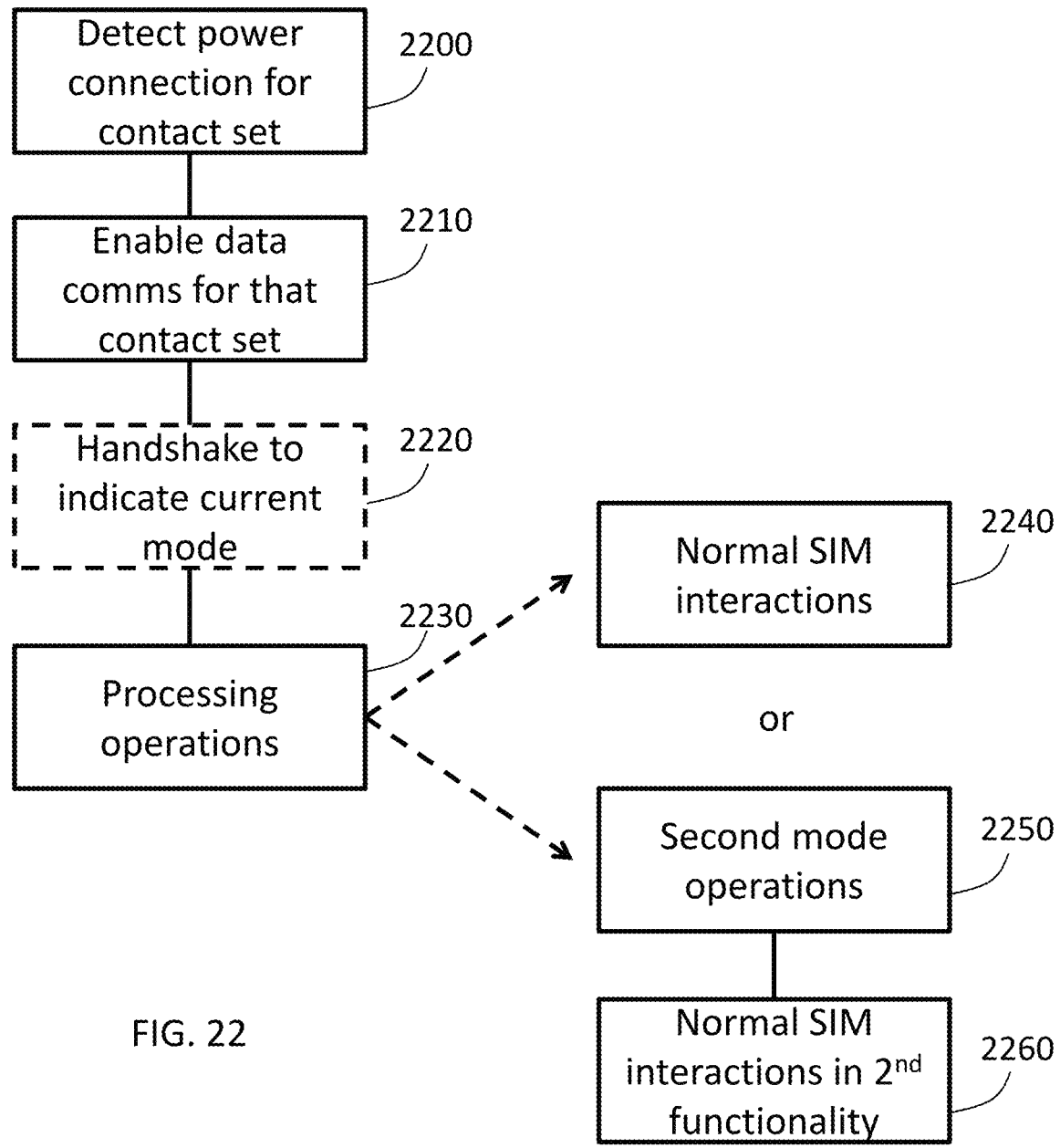
FIG. 22 is a schematic flowchart illustrating a method.

FIG. 22 schematically illustrates a technique for switching between contact sets or sharing a contact set in the arrangements of FIG. 20 or FIG. 21.

In the example method of FIG. 22, when a SIM card is installed in an arrangement in which multiple orientations are possible, a step 2200 involves detecting, using the circuitry 2010, 2110, which contact of the contact set (or which contact of multiple contact sets) which is provided with a power signal (Vcc) by the host apparatus. This identification enables either the relevant contacts set from a plurality of contact sets or the orientation of the contact set to be detected, given that the Vcc connector is generally asymmetric in a SIM card holder. If a particular SIM contact arrangement has a symmetrically disposed Vcc contact, then the location of one or more other contacts could be detected in the step 2200.

Then, at a step 2210, data communications are enabled by the contacts interface for the relevant contact set or contact set configuration.

Optionally, at a step 2220 handshaking is performed with the host device to indicate whether the "normal" SIM orientation or the further orientation defined by removing a further corner is in use. Note that this information can either be provided proactively by the SIM card, or in response to a query by the host device, or can simply be detected by the host device, for example by detecting whether substrate or gap is present at one or more of the locations 1140 of FIG. 11, for example by an optical detection technique. Then, at a step 2230, processing operations are performed. In the case of a SIM card it is normal orientation, these comprise normal SIM operations 2240 or if a corner has been removed using the techniques described above, these may provide second mode operations such as initiating or cooperating with a transition process, noting that these may also involve normal SIM interactions but within the second functionality, for example in connection with an edge server.

As mentioned above, SIM-based network communications for the repurposed operation may not be needed at all; in some examples it is only used for the device functionality transition (for example in an edge content server embodiment). Or, alternatively, for this use case, low quantities of or minimal local usage statistics could be communicated using SIM identity info for billing where the identity may potentially relate to an NGO entity (non-governmental organisation) trying to understand how the edge content server is being used.

The present techniques may be embodied by a processing apparatus (such as the circuitry 120) executing computer software. Such software, and a non-transitory machine-readable storage medium (such as the storage 180) which stores computer software which, when executed by a processing apparatus, causes the processing apparatus to perform any of the methods described above, are considered as embodiments of the present disclosure.

The techniques referred to above relate to techniques to repurpose a device, such as a smartphone, as a functionally different device, such as an edge-based, custom-content server. In examples, this may be prompted and/or enabled by the use of a further physical or embedded SIM.

In some embodiments, the process is initiated and executed via the insertion or provisioning of a further SIM, thereby making this method potentially easy, seamless, and inclusive for wide adoption throughout the developing world. That is, the person who is physically holding the phone is potentially able to easily (though not accidentally) initiate a further configuration that repurposes the old smartphone into a useful edge device, such as a custom-content server, even if the display is broken (i.e. it can still potentially work if there is otherwise no user interface or UI). The SIM insertion solution addresses the challenge of a broken display, and it is easy for a non-technical person (e.g. a rural, developing-world farmer) to understand and execute.

SIMs also generally have additional storage, which have historically been used to store contact names and numbers and some personal settings, which makes it easier to switch phones. The primary purpose of a SIM card is to allow a user's phone to connect to the network and for the network to track usage for billing. Example embodiments can make use of this storage in connection with information to be used for the transition process. The SIM storage may include the instructions that should run to do the content package download from the specified location as well as any dependent packages (e.g. server packages that were not necessary for first-life/primary-purpose device functionality). By using instructions on the SIM, we remove the need for user interaction via a UI and an app store which operate within the context of the user/owner. The new SIM operates independent of the identification of the device owner.

The transition could potentially be done by the phone owner downloading a special application, for example available via the App Store. However, embodiments that execute a transition process via a physical Second-Life SIM card may have the following features:

This method works in the case of a broken display (i.e. no display UI available)

This method inhibits a phone owner from accidentally/unintentionally changing the device functionality of their phone because they downloaded an app.

An app download approach potentially introduces the possibility of a malicious actor hiding a transition implementation within an app as a so-called Trojan horse to brick or damage a phone.

App store downloads operate with the identity of the phone owner and those (non-root) privileges may not permit fundamental changes to the OS required to redirect the functioning of the device to a new purpose.

Physical SIM insertion is a more inclusive solution, for example, in the developing world where even smartphone users may be unfamiliar with concepts such as downloading and installing apps, but clearly understand how to physically replace a SIM card in their phone.

Some products that would not otherwise need to communicate over a cellular network may choose to design in the SIM specifically for the purpose of completing infrequent over the air (OTA) updates. One example use is a way to deal with a safety recall on a piece of equipment, for example the introduction of a new method of recall that allows a fixed device to stay in place, but get upgraded to a new level of safety. Instead of moving and exchanging the equipment in the event of a recall, the equipment can be updated via an over-the-air firmware update that happens by physically inserting a further or custom SIM into the device. This is an improvement upon other options which, if they didn't require the physical removal and replacement of the equipment, would require full-time, radio-based connectivity which could interfere with the safe operation of the device (not to mention security concerns for connected devices, unnecessary power usage, and the like).

Another example use of such SIM cards for OTA firmware updates is the use case of updating the software on (for example) a home charger/inverter that operates on a bank of batteries. When the time comes to end-of-life the original batteries, battery technology may have changed enough to desire the more efficient batteries even though they require new charging protocols. Battery technology is changing rapidly, and the software running on an charger/inverter can't possibly predict the appropriate (safe, effective, and efficient) charging protocols for future battery chemistry. The present techniques may be used to simply change the firmware on the charge controller (as the physical hardware parts are completely functional), such that it can handle appropriately charging the new batteries. Manufacturers may be willing to design for SIM-based OTA updates, as customers are slow to invest due to an understanding of the continuous changes in battery technology, i.e. an understanding of an ability to update would give customers confidence to purchase, as their purchase will maintain functionality into the future. The financing for this infrastructure may actually come from car companies that are interested in seeing their EV's (electric vehicle's) battery packs move into a second life as home battery banks supporting a solar installation. There is an option for car companies to agree to implement SIM-card based OTA updates for standardization of house-level solar charge controllers that would standardize across solar vendors and EV manufacturers.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A method comprising:
    storing first configuration data and operating software for a processing apparatus;
    executing the operating software using one or more processing devices of the processing apparatus in a configuration defined by the first configuration data so as to provide first processing apparatus functionality;
    performing a transition process, the transition process comprising:
        accessing a subscriber identification module indicative of the transition process; and
        in response to accessing the subscriber identification module, replacing at least the first configuration data by second configuration data different from the first configuration data, so that said executing, in a second configuration defined by the second configuration data provides second processing apparatus functionality, different from first processing apparatus functionality defined by the first configuration data;
        inhibiting storage of the first configuration data by the processing apparatus after performing the transition process, such that the transition process is an irrevocable transition process,
    wherein the executing step comprises accessing a subscriber identification module indicative of the first configuration, different from the subscriber identification module indicative of the transition process, to define operation of the processing apparatus as a mobile telephony apparatus in the first configuration,
    wherein the subscriber identification module indicative of the first configuration comprises a planar substrate having one or more alignment formations which are asymmetrically disposed so as to inhibit the planar substrate from fitting to the module holder in an orientation other than a first predetermined orientation; in which the planar substrate is generally rectangular in shape and the one or more first alignment formations comprise one or more cut-away portions from the generally rectangular shape; and the planar substrate comprises a severable partition defining one or more portions of the planar substrate,
    the method further comprising:
        severing the severable partition to remove the one or more portions so that the planar substrate then comprises one or more second alignment formations; and
        fitting the planar substrate to the module holder in a second predetermined orientation different from the first predetermined orientation, the planar substrate when fitted to the module holder in the second predetermined orientation providing the subscriber identification module indicative of the transition process.

2. The method of claim 1, comprising:
    detecting association of the processing apparatus with the subscriber identification module indicative of the transition process; and
    initiating the performing step in response to a detection of association of the processing apparatus with the subscriber identification module indicative of the transition process.

3. The method of claim 2, in which the replacing step comprises:
    establishing a mobile communications transmission link using a subscriber identity provided by the subscriber identification module indicative of the transition process; and
    obtaining the second configuration data via the mobile telecommunications transmission link.

4. The method of claim 3, in which the replacing step comprises:
    provisioning the processing apparatus with the second configuration data; and
    rebooting the processing apparatus in the second configuration.

5. The method of claim 2, in which the subscriber identification module indicative of the transition process defines at least a universal resource indicator of a resource providing the second configuration data.

6. The method of claim 1, comprising:
    detecting an apparatus identifier associated with the processing apparatus; and
    inhibiting the performing step unless the apparatus identifier meets a predetermined condition.

7. The method of claim 1, in which:
    the configuration data comprises personal data defining at least personal attributes of a user of the processing apparatus; and
    the replacing step comprises deleting at least the personal data.

8. The method of claim 2, in which:
    the subscriber identification module indicative of the transition process and the subscriber identification module indicative of the first configuration comprise a virtual subscriber identification device which stores secure data indicating a respective first and second subscriber identity;
    the step of detecting association of the processing apparatus with the subscriber identification module indicative of the transition process comprises detecting a change of the secure data stored by the virtual subscriber identification device; and
    the method comprises downloading, using the first subscriber identity, replacement secure data indicating the second subscriber identity.

9. The method of claim 2, in which:
    the subscriber identification module indicative of the transition process and the subscriber identification module indicative of the first configuration are physical subscriber identification devices for fitting to a module holder of the processing apparatus; and the step of detecting association of the processing apparatus with the subscriber identification module indicative of the transition process comprises detecting insertion of the subscriber identification module indicative of the transition process into the module holder of the processing apparatus.

10. The method of claim 1, in which:

the processing apparatus is a mobile telecommunications apparatus;

the first processing apparatus functionality defines mobile telecommunication operation using a first set of wireless communication frequencies; and the second processing apparatus functionality defines mobile telecommunication operation using a second set of wireless communication frequencies, in which at least some of the second set wireless communication frequencies are not in the first set of wireless communication frequencies.

11. A non-transitory machine-readable storage medium which stores computer software which, when executed by a processing apparatus, causes the processing apparatus to perform the method of claim 1.

12. A device comprising:

a planar substrate having one or more alignment formations which are asymmetrically disposed so as to inhibit the planar substrate from fitting to a complementary module holder in an orientation other than a first predetermined orientation; in which:

the planar substrate is generally rectangular in shape and the one or more first alignment formations comprise one or more cut-away portions from the generally rectangular shape; and the planar substrate comprises a severable partition defining one or more portions of the planar substrate such that, when the one or more portions are removed by severing of the severable partition, the planar substrate comprises one or more second alignment formations, disposed so as to allow the planar substrate to fit to the module holder in a second predetermined orientation different from the first predetermined orientation.

13. The device of claim 12, comprising:

a first set of electrical contact portions configured to abut complementary contact portions of the module holder when the device is fitted to the module holder in the first predetermined orientation; and a second set of electrical contact portions, at least some of the second set of electrical contract portions being different from the first set of electrical contact portions, configured to abut the complementary contact portions of the module holder when the device is fitted to the module holder in the second predetermined orientation.

14. The device of claim 13, comprising:

first processing circuitry connected to the first set of electrical contact portions and configured to provide a first processing function when the device is fitted to the module holder in the first predetermined orientation; and second processing circuitry connected to the second set of electrical contact portions and configured to provide a second processing function, at least partly different from the first processing function, when the device is fitted to the module holder in the second predetermined orientation; in which the device is a subscriber identification module (SIM); and at least the first processing circuitry provides subscriber identification functions to enable mobile telecommunications by a processing apparatus according to a first subscriber identity when the device is fitted to a module holder of the processing apparatus.

15. The device of claim 12, in which:

the first alignment formations comprise one or more cut-away portions from a first corner of the generally rectangular shape; and the severable partition defines a corner portion removable from a second corner, different from the first corner, of the generally rectangular shape.

16. A method comprising:

storing first configuration data and operating software for a processing apparatus;

executing the operating software using one or more processing devices of the processing apparatus in a configuration defined by the first configuration data so as to provide processing apparatus functionality;

executing a transition process to replace at least the first configuration data by second configuration data different from the first configuration data, so that the executing step, in a configuration defined by the second configuration data, provides second processing apparatus functionality, different from first processing apparatus functionality provided in a configuration defined by the first configuration data; and inhibiting storage of the first configuration data by the processing apparatus after performing the step of executing the transition process, such that the transition process is an irrevocable transition process, wherein the executing comprises accessing a subscriber identification module indicative of the first configuration, different from the subscriber identification module indicative of the transition process, to define operation of the processing apparatus as a mobile telephony apparatus in the first configuration, wherein the subscriber identification module indicative of the first configuration comprises a planar substrate having one or more alignment formations which are asymmetrically disposed so as to inhibit the planar substrate from fitting to the module holder in an orientation other than a first predetermined orientation; in which the planar substrate is generally rectangular in shape and the one or more first alignment formations comprise one or more cut-away portions from the generally rectangular shape; and the planar substrate comprises a severable partition defining one or more portions of the planar substrate, the method further comprising:

severing the severable partition to remove the one or more portions so that the planar substrate then comprises one or more second alignment formations; and fitting the planar substrate to the module holder in a second predetermined orientation different from the first predetermined orientation, the planar substrate when fitted to the module holder in the second predetermined orientation providing the subscriber identification module indicative of the transition process.

* * * * *